United States Patent [19]

Lary

[11] Patent Number: 6,059,066
[45] Date of Patent: May 9, 2000

[54] SEATBELT USAGE INDICATOR

[76] Inventor: Banning G. Lary, 6280 Sunset Dr., Suite 411, Miami, Fla. 33143

[21] Appl. No.: 09/057,890

[22] Filed: Apr. 9, 1998

[51] Int. Cl.[7] .............................. B60Q 1/00; B60R 21/00
[52] U.S. Cl. ....................... 180/268; 340/457.1; 340/438
[58] Field of Search ........................ 280/801.1; 180/268, 180/271; 340/457.1, 438; 307/10.1

[56] References Cited

U.S. PATENT DOCUMENTS

| 3,665,385 | 5/1972 | Booth | 340/52 E |
|---|---|---|---|
| 3,703,618 | 11/1972 | Lewis | 200/85 R |
| 3,866,167 | 2/1975 | Hirano | 340/52 E |
| 3,967,237 | 6/1976 | Jenne | 340/52 E |
| 4,197,919 | 4/1980 | Redmond | 180/269 |
| 4,849,733 | 7/1989 | Conigliaro et al. | 340/457.1 |
| 4,885,566 | 12/1989 | Aoki et al. | 340/457.1 |
| 5,877,707 | 3/1999 | Kowalick | 340/988 |

*Primary Examiner*—J. J. Swann
*Assistant Examiner*—Christopher Bottorf
*Attorney, Agent, or Firm*—McHale & Slavin

[57] ABSTRACT

A method of indicating seatbelt usage to observers outside a vehicle. The method employs buckle assemblies, pressure switches, and belt position sensors to send information diagnostic information to a processor. The processor includes control electronics that analyzes the diagnostic information and sends display instructions to an indicator assembly. The indicator assembly is directs easily-discernable visual output to a conspicuous location on the monitored car. The method provides information that is recognizable regardless even if the monitored vehicle is in motion.

4 Claims, 6 Drawing Sheets

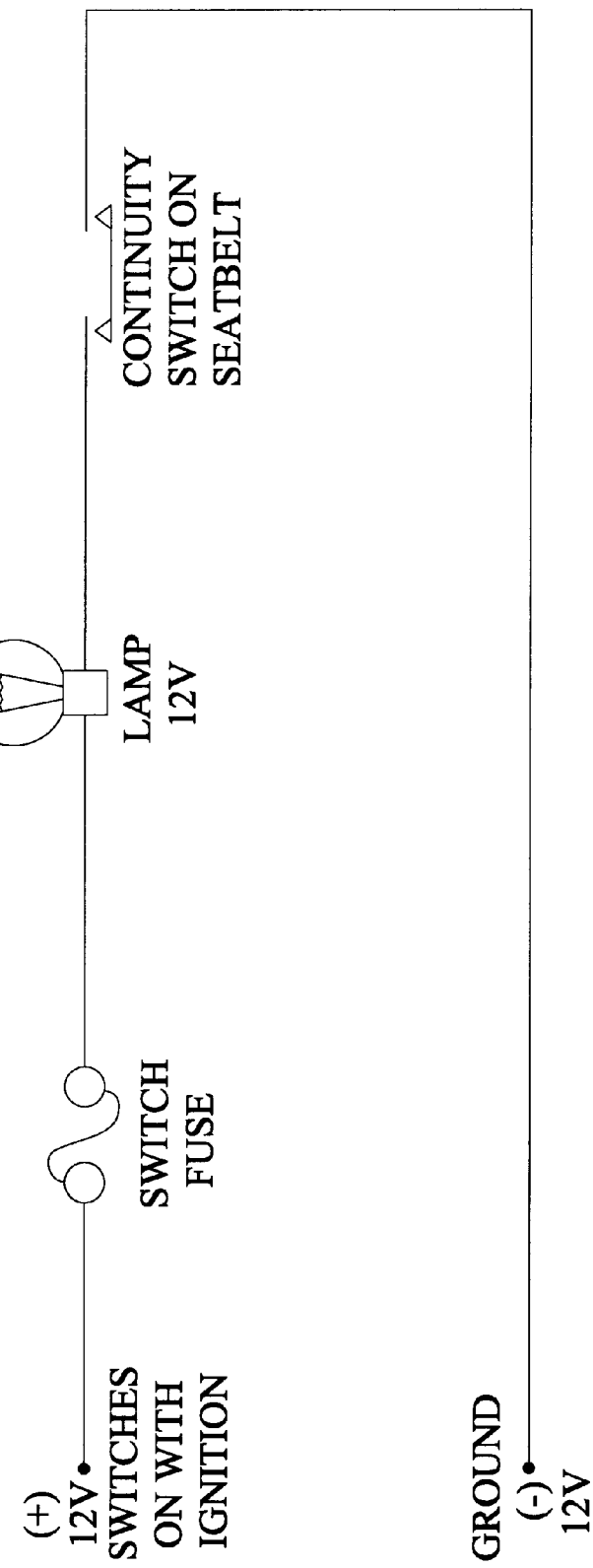

SEATBELT USAGE INDICATOR

FIELD OF THE INVENTION

The invention is related to the safety of occupants within a vehicle and more particularly to a method of indicating seatbelt use.

Background of the Invention

The safety benefits provided by proper seatbelt use are well documented. When worn correctly, seatbelts provide a simple and effective means of protecting vehicle occupants from accident-related injuries.

The use of seatbelts has been made a legal requirement in a number of states. Despite the legal requirement, individuals continue to choose not to employ the seatbelts so their use is encouraged in a variety of ways. One approach is to use the media to educate the public about the benefits of seatbelts. Public service announcement campaigns employ, for example, the mishaps of animated mannequins, or "dummies", who travel by car without seatbelt protection. The campaigns encourage the viewing audience to avoid the tragedies that befall "dummies" who do not wear seatbelts during car travel. Although this campaign might affect some car travelers, many individuals never see, will forget, or may simply ignore the pro-seatbelt message promoted by the campaign.

Legislation that impose fines upon those who travel public roads without a seatbelt can be difficult to enforce and often present logistical problems. For example, car travelers who wear a seatbelt to avoid incurring fines may wear their seatbelt only when police are close enough to see through a car window. Once away from police officers, however, these drivers simply unbuckle the previously-buckled belt. Even drivers who are not wearing a seatbelt when stopped for a traffic violation may avoid incurring seatbelt law violation fines by buckling the belt before the police officer approaches the vehicle. Since it is often difficult to determine if a seatbelt is fastened while an automobile is in motion, an alert driver may present the appearance of long-term belt use simply by fastening an unbuckled seatbelt while slowing the car to a stop. Many states allow tinted windows, making it impossible for officers to assess seatbelt use even in slow-moving cars. Thus, while mandatory seatbelt use laws effectively persuade some car travelers, enforcement is difficult and compliance is often sporadic.

For a variety of reasons, neither media campaigns nor legislatively-imposed fines are sufficient to encourage seatbelt use in all car travelers. Despite the safety benefits and government encouragement, many car travelers still choose not to wear seatbelts.

To encourage die-hard non-wearers, there have been a number of vehicle-mounted devices developed to encourage seatbelt use. Some devices produce audio cues designed to remind car travelers to wear a seatbelt. Other devices emit flashes of light or other visual signals to indicate the presence of unbuckled seatbelts. Often these devices produce their cues only for a predetermined length of time, stopping at the end of a factory-set period of time. Although timed prompts may promote seatbelt use in willing seatbelt wearers, they often do little to sway those who are more reluctant. Car travelers may defeat timed reminders simply ignoring the emitted signal until the device shuts off.

Other reminders flash or emit sound continuously until all belts are fastened. These devices are only moderately more persuasive than timed devices. A flashing dashboard light is easily ignored and a clipped wire or two will silence even the most annoying buzzer. Known cue-producing reminders may increase seatbelt use among willing travelers, but they are not sufficient to sway those determined to ride without wearing a seatbelt.

Other devices follow yet a different approach. Rather than merely remind riders, such devices seek to force seatbelt use by preventing vehicle operation until all seatbelts are fastened. For instance, U.S. Pat. No. 4,197,919 permits automobile operation, but limits travel to motion in either first gear or reverse. U.S. Pat. No. 3,866,167 prohibits even low-speed driving by physically preventing key insertion until all seatbelts have been buckled. By controlling vehicle operation, these devices effectively force seatbelt use. However, since seatbelt use is not mandated in all areas, vehicles that forced seatbelt use are unacceptable in many places. Additionally, devices that can disable a vehicle or that add confusion to the inside of an automobile, i.e. lights or buzzers, can be dangerous.

Thus, what is needed is a low-cost, effective method of encouraging individuals to wear seatbelts at all times while in a moving vehicle. The device may act passively, providing seatbelt use information to observers outside a car. The device should indicate seatbelt use or nonuse at all times, while allowing beltless driving where acceptable.

SUMMARY OF THE INVENTION

The instant invention is a method of indicating the nature of seat belt use in a given monitored vehicle. The method uses an indicator that provides an indication of seatbelt to observers who are outside the vehicle. The indicator may send information to remote locations, for example, via RF signals, depending upon the type of installation.

A basic embodiment of the device includes a light visible to the outside of a vehicle; the light would indicate seatbelt use while the vehicle is in operation. In this manner, the light provides an indication of seatbelt use that is readily-discernable to observers outside the vehicle. By inviting peer pressure and threat of police action, the light will encourage seatbelt use. The light can be discreetly mounted in one of the window moldings, in connection with the raised brake light, on the tops of vehicle front fenders, and so forth. Various embodiments of the invention allow a light to change colors so as to provide a positive indication that seatbelts are fastened properly. For instance, a green light may indicate proper seatbelt use, and an orange light may indicate improper seatbelt use. A yellow light may indicate a malfunction in the diagnostic equipment.

Thus, an object of the instant invention is to provide a method of indicating seatbelt usage to observers inside and outside a monitored car.

Still another object of the instant invention is to provide a method of indicating seatbelt usage that also uses positive reinforcement and peer pressure to encourage seatbelt use.

Yet another object of the instant invention is to provide a method of indicating seatbelt usage that allows a traffic officer to assess seatbelt usage from a remote location.

Yet still another objective of the instant invention is to disclose the use of a seatbelt illumination device that can be installed without wires by use of a narrow-band, close-range radio frequency apparatus.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2a is a schematic diagram of the buckle closure analysis circuitry of the present invention;

DETAILED DESCRIPTION OF THE PREFERRED EMBODIMENT

Figure 1:
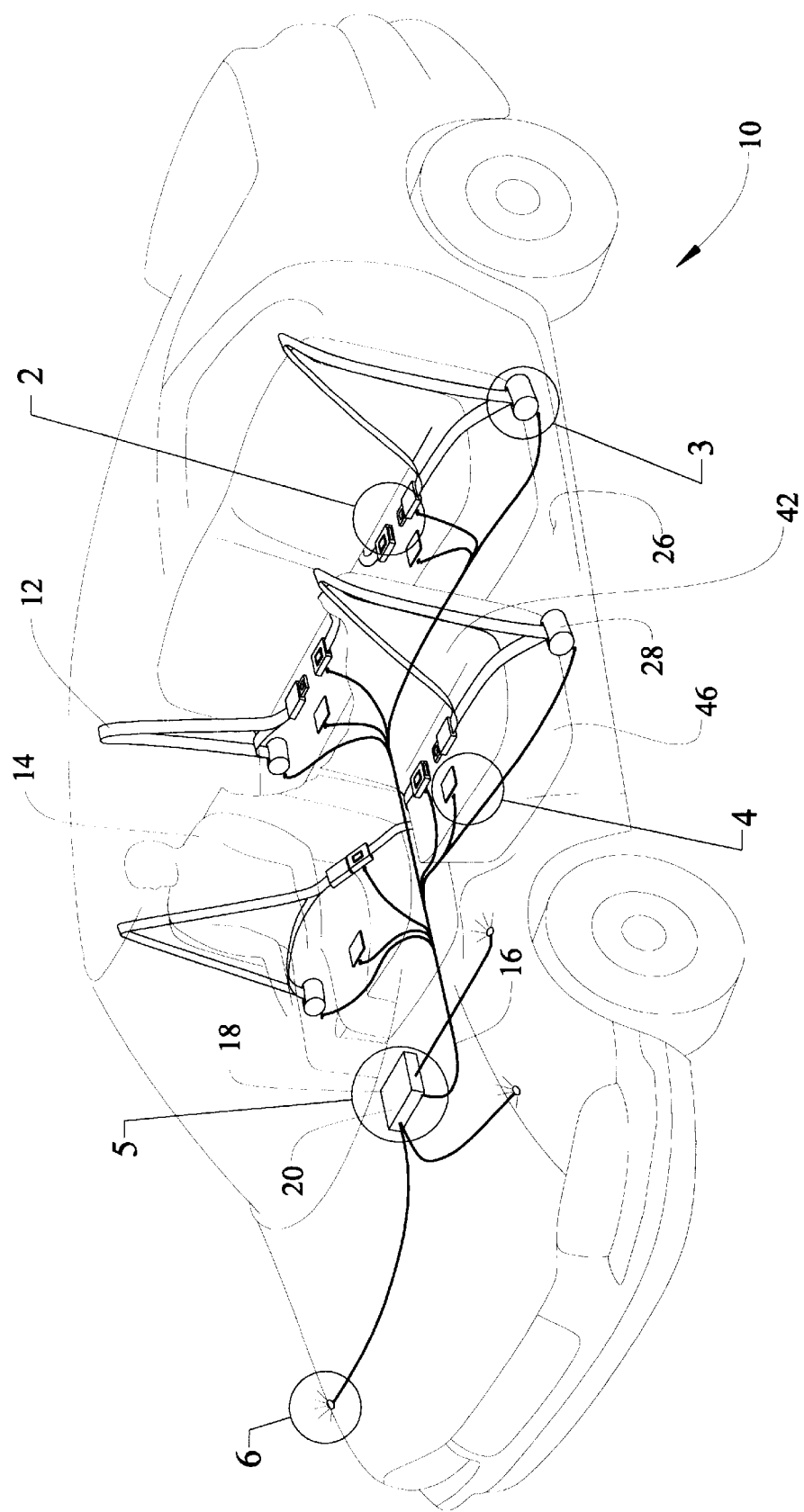
FIG. 1 is a pictorial view of a vehicle equipped to practice the method of the present invention.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown in the drawings and described in the specification.

FIGS. 1–7 illustrate a manner of implementing the method of the present invention. These illustrations provide an example of the environment in which the invention is to be practiced. Although those skilled in the art will recognize that the method of the present invention may be performed on a variety of vehicles, FIGS. 1–7 provide context for the following discussion.

Figure 7:
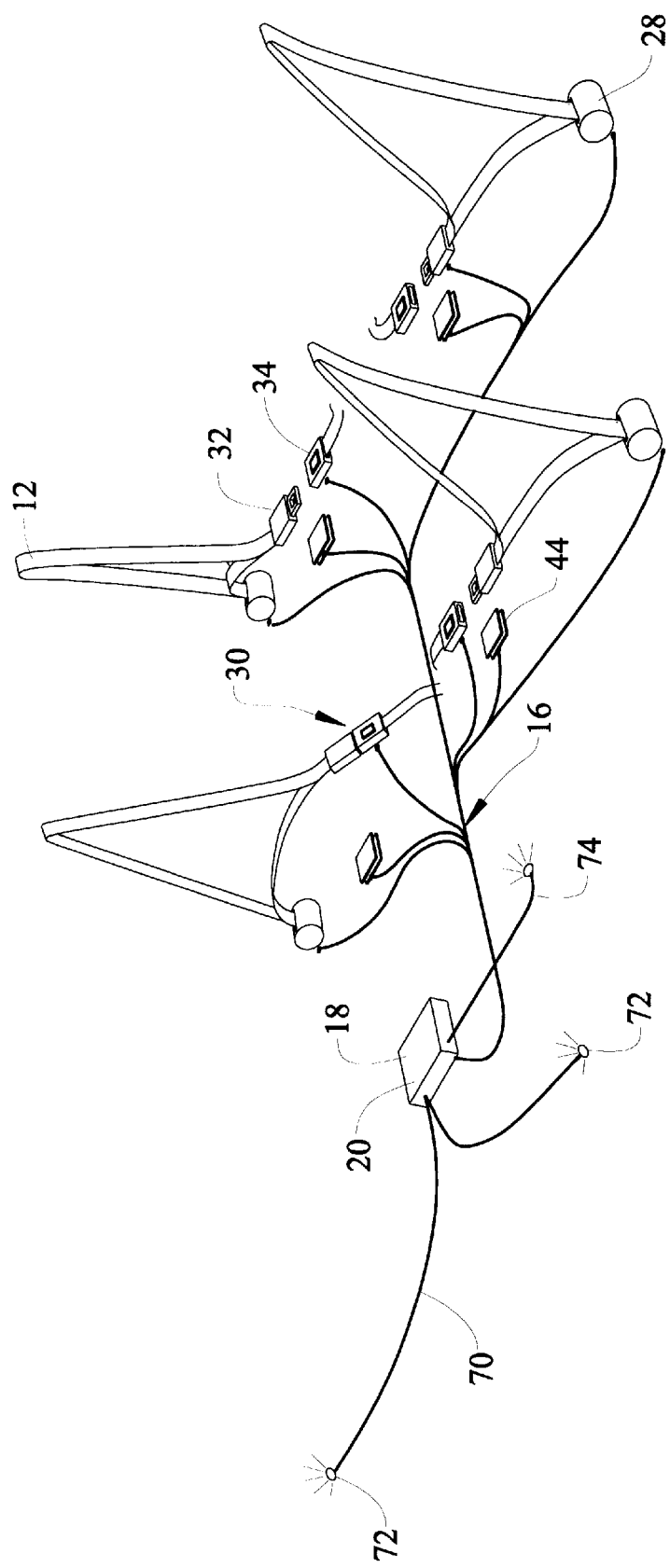
FIG. 7 is a diagrammatic view of the systems displayed in FIG. 1, shown without the host vehicle.

By way of overview, and with reference to FIGS. 1 and 7, the method of the present invention involves providing a vehicle 10 with at least one restraint device 12, such as a seatbelt, to maintain a passenger 14 in a predetermined orientation; providing the vehicle with a monitoring system 16 that generates signals which indicate whether the restraint devices are fastened or unfastened; providing a processing means 18 that will analyze the signals to produce display instructions; and providing the vehicle with an indicator assembly 20 that generates output in response to the display instructions. As will be described in more detail below, the indicator assembly 20 produces output that is discernable to persons outside the car 10, even while the car is moving.

Figure 2:
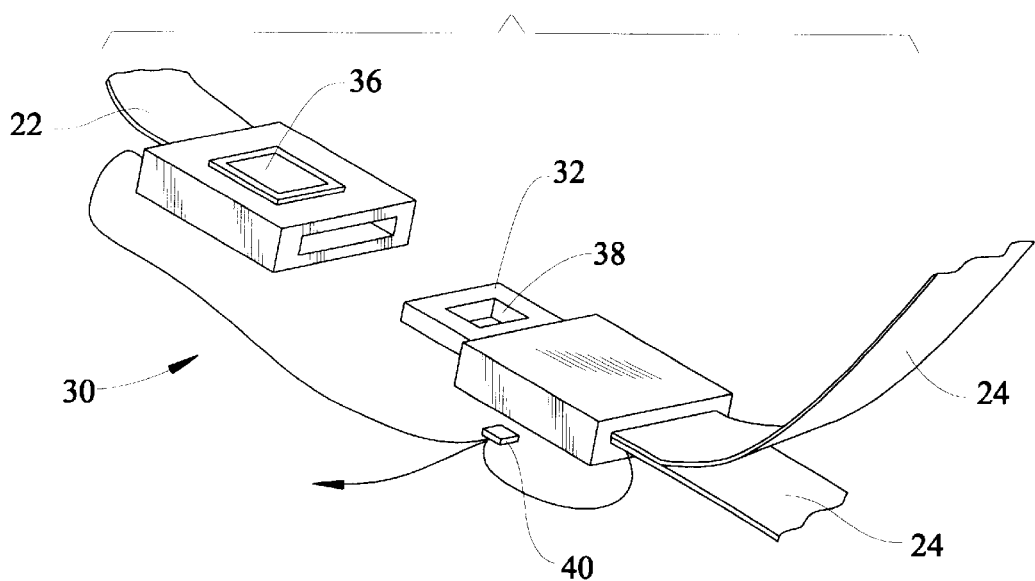
FIG. 2 is a pictorial view of a buckle assembly of the present invention.
Figure 3:
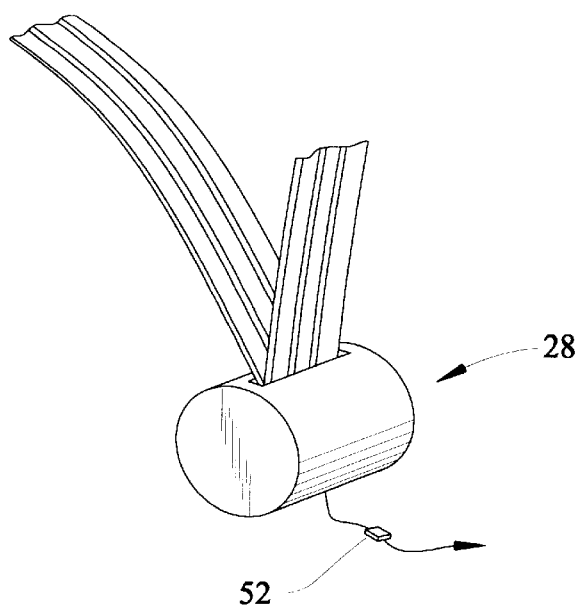
FIG. 3 is a close-up pictorial view of the tensioning system of the present invention.
Figure 4:
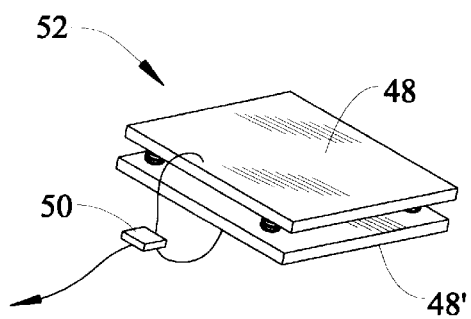
FIG. 4 is a close-up pictorial view of a pressure switch of the present invention.

Now, with additional reference to FIGS. 2 and 3, one type of appropriate restraint 12 device is shown. In the present embodiment, a passenger car 10 is equipped with four shoulder-harness-type seatbelts 12. These belts 12 have free ends 22,24 anchored to the car frame 26 and each belt 12 includes an integrated tensioning system 28. The tensioning system 28 automatically adjusts the seatbelt 12 to an appropriate length, advantageously removing unwanted slack to hold an associated passenger 14 securely. Each belt 12 also includes a buckle assembly 30 that keeps the belt 12 securely fastened. The buckle assembly 30 includes a buckle tongue 32 sized to slide into a buckle housing 34. A spring-loaded locking tab 36 engages a locking notch 38 disposed in the buckle tongue 32, releasably securing the buckle tongue within the buckle housing 34.

Each buckle assembly 30 is part of the monitoring system 16 and is electrically connected to the processing means 18. Inserting the buckle tongue 32 into the buckle housing 34 energizes an electric circuit 40, detailed in FIG. 2a, sending a corresponding signal to the processing means 18. The processing means 18 analyzes signals sent from each of the buckle assemblies 30 and sends appropriate instructions to the indicator assembly 18.

In a preferred embodiment, the monitoring system 16 also includes a pressure switch 42 mounted in each seat 44. More specifically, the pressure switches 42 are mounted in the base 46 of each seat 44. With additional reference to FIG. 4, each switch 42 includes spring-biased contact plates 48,48' that complete an electric circuit 50 when forced together. As a result, the pressure switch 42 registers an occupied or vacant state within the associated seat 44 and sends a corresponding signal to the processing means 18.

In this embodiment, the processing means 18 combines feedback from each buckle assembly 30 with information from each corresponding pressure switch 42. Unfastened belts 12 that are associated with occupied seats 42 transmit a fault signal to the processing means 18. In this manner, the method of the present invention does not require unoccupied seats 42 to be fastened.

As indicated in FIG. 3, each seat 44 may also include a position monitor 52 that provides feedback about the length of seatbelt 12 dispensed from the within the tensioning system 28. This information is sent to the processing means 18, where it is used to further analyze seatbelt usage. If a seat 44 is occupied and the corresponding seatbelt 12 has been buckled, information from the position monitor 52 indicates how much of the belt has been dispensed. The processing means 18 analyzes this information and sends a fault signal if a predetermined minimum length of belt 12 is not dispensed. In essence, the position monitor 52 helps dissuade passengers who might attempt to avoid wearing a seatbelt 12 by fastening the buckle assembly 30 and then placing the seatbelt behind them.

Although the pressure switch 42 and position monitor 52 provide useful information, neither device 44,52 is required for successful implementation of the present method. Either or both devices 44,52 may be replaced or eliminated if desired. Additionally, the fastened or unfastened nature of the seatbelts 12 may need not be indicated by electric circuits 40. For instance, the buckle assemblies 30 may incorporate other diagnostic tools, including optical sensors or magnetic feedback relays.

Figure 5:
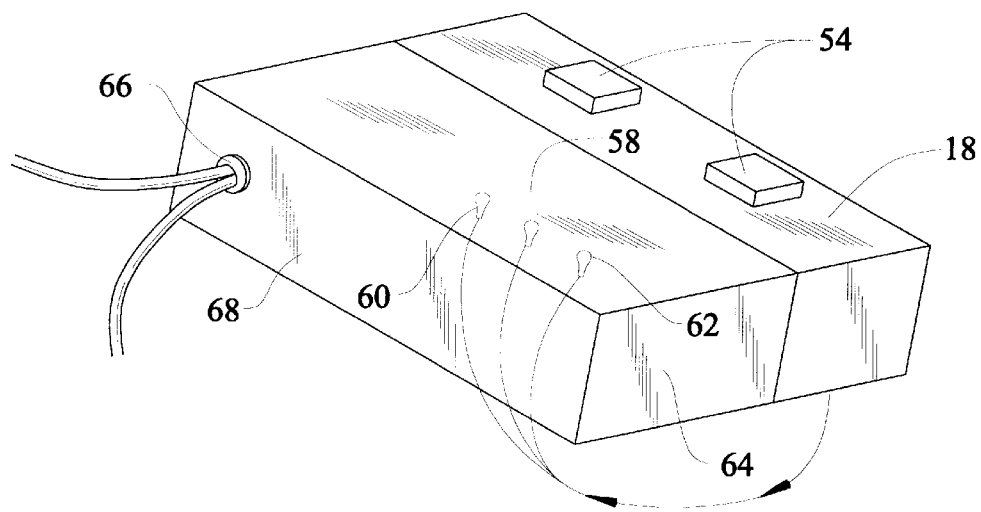
FIG. 5 is a close-up pictorial view of the indicator assembly and processing means of the present invention.
Figure 6:
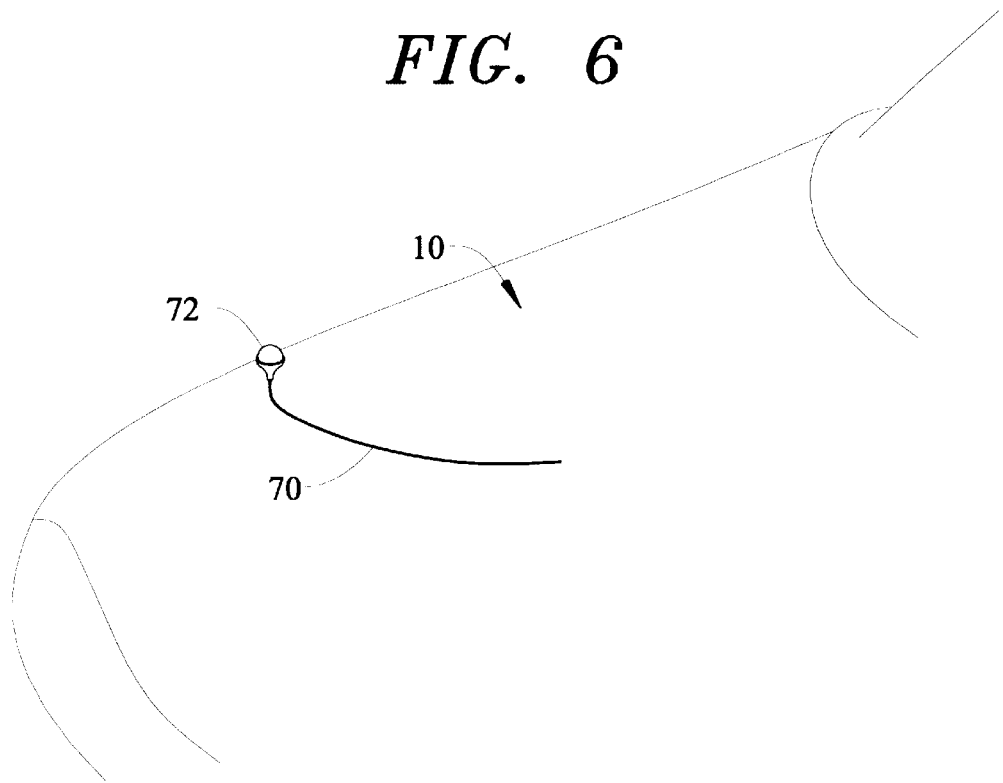
FIG. 6 is a close-up pictorial view of an indicator orb mounted in the fender of the vehicle shown in FIG. 1.
Figure 5A:
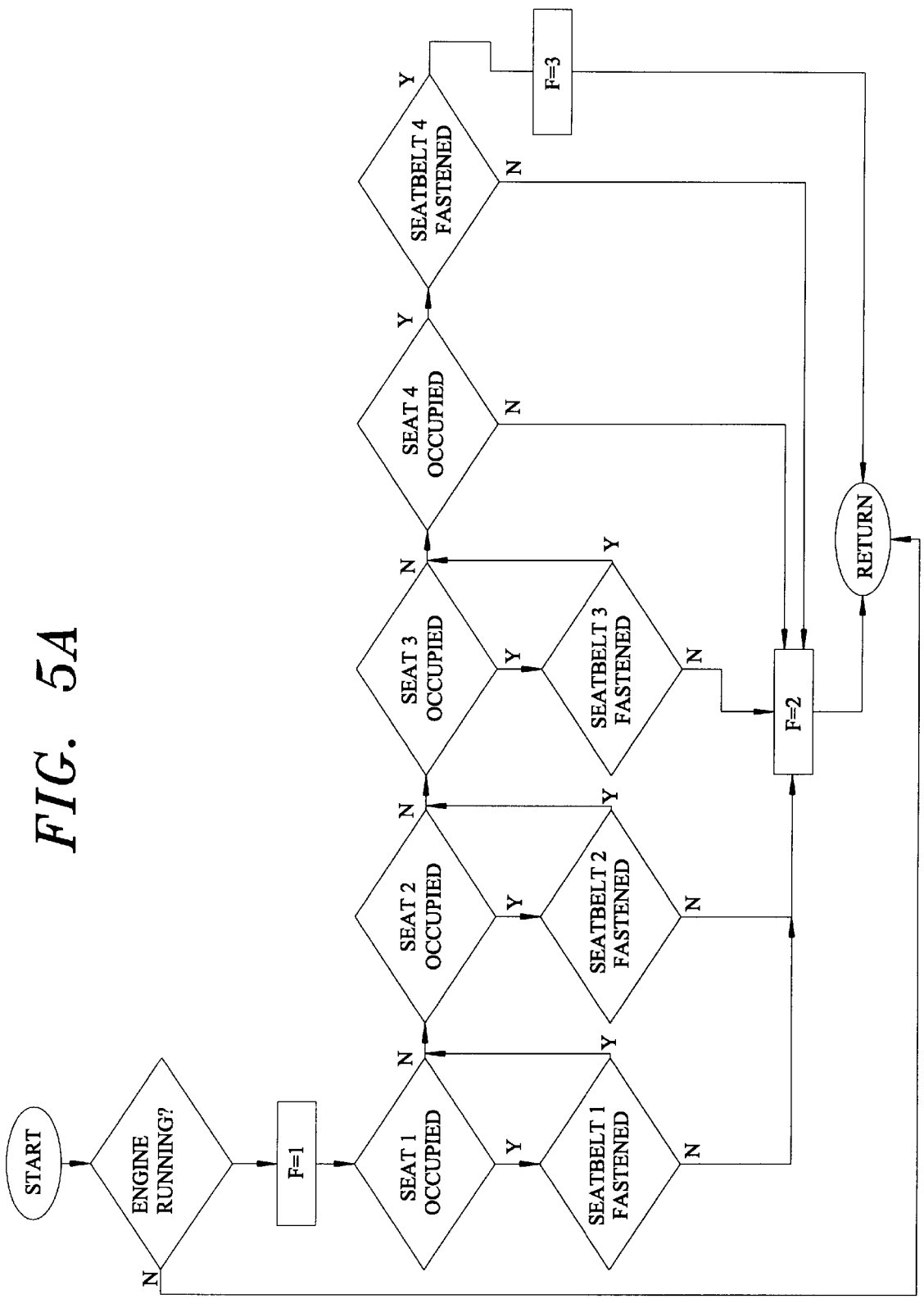
FIG. 5a is a flow chart of a seatbelt analysis subroutine called during practice of the method of the present invention.

As described above, once the buckle assemblies 30, the pressure switches 42, and the position monitors 52 have gathered information about the nature of seat 44 occupancy and belt 12 usage, the information is sent to the processing means 18, represented in FIG. 5. In a preferred embodiment, the processing means 18 includes control electronics 54 having a microcontroller, not shown, that calls and executes a number of subroutines. One of the subroutines called by the microcontroller is a seatbelt analysis subroutine 56. The flow of one embodiment of the seatbelt analysis subroutine 56 is depicted in FIG. 5a. For clarity purposes, the embodiment shown in FIG. 5a does not include use of position monitors 52. The seatbelt analysis subroutine 56 is preferably called several times a second while a key, not shown, is in the ignition, not shown.

Depending upon the nature of signal desired, a number of signal types may be sent from the processing means 18 to the indicator. In one embodiment, the indicator assembly 20 includes a series of lights 58,60,62 disposed within a rigid housing 64, as shown in FIG. 5. More specifically, the housing 64 includes a yellow light 58, a red light 60, and a blue light 62. The housing 64 is light tight, but includes a light escape aperture 66 disposed in a housing front wall 68. Light from within the housing 68 is emitted through the light exit aperture 66.

In a preferred embodiment, the lights 58,60,62 are illuminated in a specific manner, so as to provide a visual indication of the state of seatbelt 12 use in the occupied seats 12 of the vehicle 10 being monitored. More particularly, the lights are illuminated in the following manner: The yellow light 58 is illuminated as soon as a key, not shown, is placed in the ignition, not shown. The yellow light 58 remains lit until the key is removed. The red light 60 is illuminated when, as indicated by the processing means 18, at least one occupied seat 44 has a seatbelt 12 that is either fastened incorrectly or not fastened at all. The blue light 62 is illuminated when, as indicated by the processing means, all occupied seats 42 have properly fastened seatbelts 12.

Because the three lights 58,60,62 are contained within a single housing 64, advantageous color mixing occurs when two of the lights are illuminated simultaneously. For example, when both the yellow light 58 and the red light 60 are illuminated, the housing is filled with an orange-colored light. Alternately, if both the yellow light and the blue light 62 are illuminated, the housing is filled with green-colored light.

These composite colors provide diagnostic information that helps the viewer understand the exact nature of seatbelt 12 usage within a monitored car 10. The composite colors work as follows: A orange color, produced by light mixed from the yellow light 58 and red light 60, means that the system is functioning properly but that not all of the passengers are properly secured. A green light, produced by light mixed from the yellow light 58 and the blue light 62, means that the system is operational and that all seatbelts are fastened correctly. Light produced only by the yellow light 58 indicates that a given car is equipped to perform the method of the present invention, but that the equipment is malfunctioning in some manner.

Once light leaves the housing through the light exit aperture, it may be directed in a manner of ways. In a preferred embodiment, a branched fiber optic cable 70 extends from the rigid housing 64, outward through the light exit aperture 66 to pair of translucent orbs 72. The orbs 72 are mounted in a conspicuous location, like a top surface of the car front quarter panels. The fiber optic cable 70 provides a conduit through which light from the indicator assembly may be directed to the translucent orbs. As a result, the orbs are optically connected to the indicator means and emit the same color light as is present in the housing. The orbs may be replaced or supplemented by other devices. For example, the fiber optic cable may also be directed to a translucent display panel. The panel could include a dispersion lens that makes the light emitted from the fiber optic cable easier to see. By using flexible fiber optic cable, the presently-described indicator may be used with a variety of vehicles and direct light to a variety of visible locations. With several cables, the signal may be directed to more than one location on a given vehicle. Alternatively, the housing 64, itself, may be translucent. The indicator assembly 20 may also send a signal to a traditional dashboard-mounted indicator light 74.

The method of the present invention need not be practiced with mixed color output. Once the processor means analyzes the information sent from the monitoring system 16, a variety of other indication schemes could be activated. Other indicators might include a collection of lights illuminated in various distinctive patterns, a simple on/off toggle light, or even sound emitting devices. However, the multi-color output of the present embodiment allows observers to distinguish between cars with malfunctioning diagnostic equipment and cars that are not equipped to practice the present invention. With this extra information, a police officer might choose to issue warnings requiring repair of malfunctioning equipment. Alternatively, citations for tampering with diagnostic equipment could be issued if appropriate.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A seatbelt use indicator in combination with a vehicle having a plurality of seatbelts sized and positioned to maintain at least one passenger in a predetermined location, said indicator comprising:

a means for monitoring said plurality of seatbelts to determine a properly fastened state or an improperly fastened state within each of said seatbelts;

a means for generating signals operatively linked to said means for monitoring, said means for generating signals adapted to produce a first signal indicative of an operational state within said means for monitoring and a simultaneous second signal indicative of said properly fastened or improperly fastened states within said seatbelts; said first signal being illumination having a first color; said second signal being illumination having a second color when each of said seatbelts is in a properly fastened state, and said second signal being illumination having a third color when at least one of said seatbelts is in an improperly fastened state; and an indicator assembly operatively associated with said means for generating signals, said indicator assembly being adapted to produce diagnostic illumination having a color determined by said first and second signals, said diagnostic illumination being discernable from inside said vehicle and from outside said vehicle;

whereby said color of said diagnostic illumination indicates to individuals inside said vehicle and outside said vehicle whether said means for monitoring is operating and whether said seatbelts are in a properly fastened state or an improperly fastened state.

2. The seatbelt use indicator and vehicle combination of claim 1, wherein:

said means for monitoring includes a buckle assembly adapted to produce output indicative of a fastened or unfastened state of said seatbelt.

3. The seatbelt use indicator and vehicle combination of claim 1, wherein:

said means for monitoring includes at least one seat disposed within said vehicle; and a pressure-sensitive switch disposed in said at least one seat, said pressure sensitive switch adapted to produce output indicative of an occupied or an unoccupied state within said seat.

4. The seatbelt use indicator and vehicle combination of claim 1, wherein:

said indicator assembly includes at least one light emitting member disposed on a front quarter panel of said vehicle.

\* \* \* \* \*